(No Model.)

J. E. DAY.
WELL BORING APPARATUS.

No. 406,200. Patented July 2, 1889.

Witnesses,
Geo. H. Strong
J. K. Krouse

Inventor
Jeremiah E. Day
By Dewey & Co.,
attys

UNITED STATES PATENT OFFICE.

JEREMIAH E. DAY, OF SAN FRANCISCO, CALIFORNIA, ASSIGNOR OF ONE-HALF TO JOSEPH PRACY, OF SAME PLACE.

WELL-BORING APPARATUS.

SPECIFICATION forming part of Letters Patent No. 406,200, dated July 2, 1889.

Application filed February 11, 1889. Serial No. 299,498. (No model.)

*To all whom it may concern:*

Be it known that I, JEREMIAH E. DAY, of the city and county of San Francisco, State of California, have invented an Improvement in Well-Boring Apparatus; and I hereby declare the following to be a full, clear, and exact description of the same.

My invention relates to improvements in well-boring apparatus.

It consists in a combination of an auger or spiral, by which the boring is accomplished, with the outer tube or casing of a sand-pump and valves fitted to the auger-blades, together with cutters forming the edge of the auger, projecting beyond the bottom of the cylinder-barrel, the lower part of which is fitted to engage the backs of the cutters, as will be more fully explained by reference to the accompanying drawings, in which—

Figure 1:
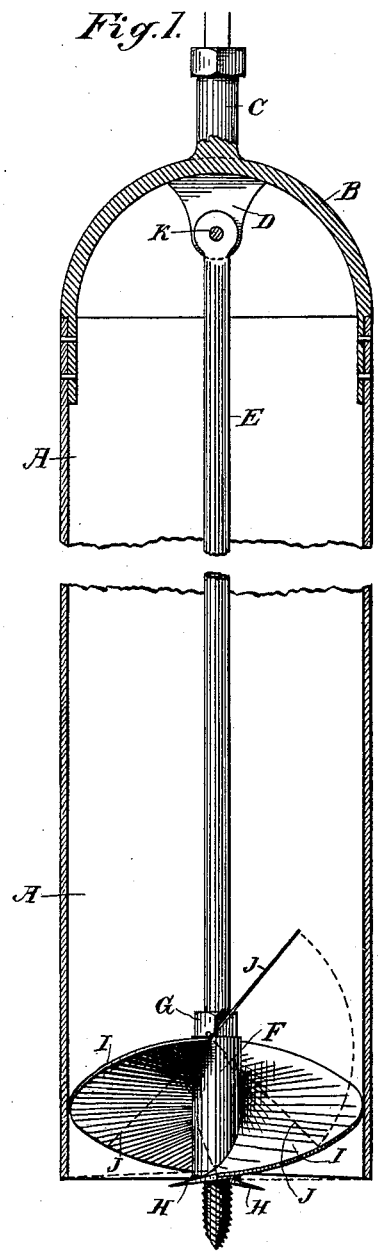
Figure 2:
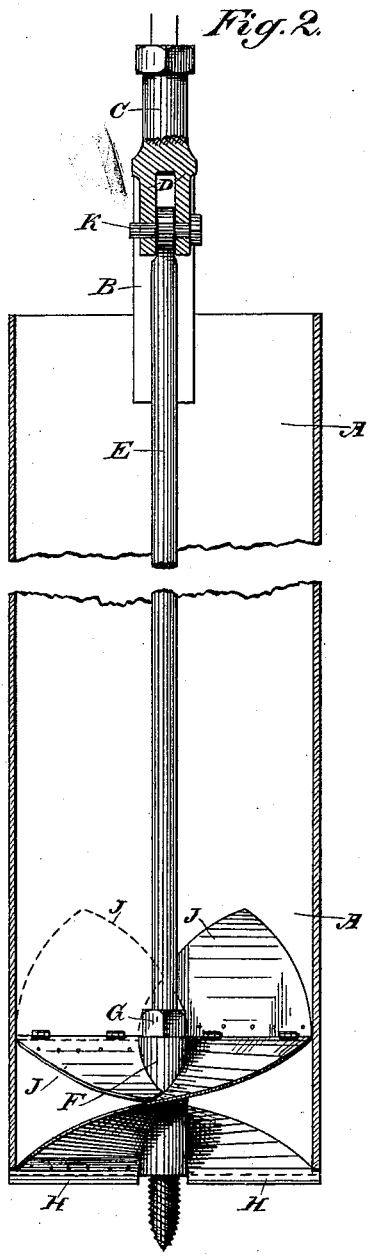

Figure 1 is a vertical section of the sand-pump barrel, showing the auger, with an edge view of one of the valves, which is hinged upon it. Fig. 2 is a similar section showing the auger turned at right angles with its position as shown in Fig. 1.

A is the cylindrical barrel of the sand-pump, having a diameter small enough to allow it to pass down into the well-casing, at the bottom of which the work is to be done. This barrel has at the top a circular bail B, with the shank C, through which it is connected with the rods by which it is to be operated. In the center of the bail B are two downwardly-projecting lugs D, which are forged on it and serve for the attachment of the eye at the head of the rod E. This rod has its lower end pointed and screw-threaded, as shown, and the hub F of the auger screws onto the lower end of the rod, and is secured by a lock-nut G. In the present case I have shown the auger consisting of two spiral blades, which make a turn around the hub F upon opposite sides. Upon the lower ends of each of these blades are fixed cutters H, which are suitably secured by bolting or otherwise to the blades, and these cutters project slightly outside of the cylinder A below the bottom of the same.

The bottom of the cylinder is notched in such a manner that the notch on each side will press against the back of the projecting cutter H, and it thus allows power to be transmitted from the operating-rods through the bail B and the cylinder A to turn the auger, and thus relieve the central auger-rod E from the strain of this work.

The operation of this device (which is intended to be used in ground which is soft enough to be worked without the aid of the drill) will be as follows: The pump-barrel A, being turned around, will carry with it the screw or auger I, and the blades H will cut the material and bring it up inside of the barrel A until the latter is sufficiently full to be raised to the surface. In order to retain the material within the barrel until it can be raised to the surface, I have shown the valves J. These valves are hinged to the upper edge of each of the blades of the auger I, and are so formed that when they close the inner edge of each blade will lie upon the curved surface of the auger-blades, while the back of the valve fits the inner circumference of the barrel A. These valves, being hinged to the upper edges of the auger-blades, will easily open from the pressure of material arriving from below, and will take a position which is approximately a continuation of the upper ends of the auger-blades, so that the material can pass freely as long as the apparatus is being operated. When full, these valves will close if the material be thin or show any tendency to run out, and will retain it until the barrel A has been brought to the surface. When this has been accomplished, the rod E is detached from the lugs D by simply withdrawing the bolt K, by which it is connected, and the auger, with the rod E, will then drop out of the bottom of the barrel A, thus allowing the contents to be discharged and avoiding the necessity for a tackle or other means for reversing the barrel to discharge its contents, which is usually practiced.

Having thus described my invention, what I claim as new, and desire to secure by Letters Patent, is—

1. The auger having the cutting blades or bits of greater length than the diameter of the auger, the inclosing case or barrel fitting the auger and having the shoulders to engage the projecting blades, the bail by which the upper end of the barrel is connected with the operating-rods, the lugs projecting downwardly from the center of the bail, and the auger-rod connected with said lugs by a bolt, substantially as and for the purpose herein described.

2. The exterior barrel or casing, with a bail for connecting the upper end with the boring-rods, lugs projecting downwardly from the center of said bail, an auger fitting the interior and lower end of the barrel and having its shank detachably connected with the lugs, and bits or cutters fitted to the lower ends of the auger-blades and extending beyond the bottom of the barrel and engaging the shoulders thereon, in combination with the valves hinged to the upper edges of the auger-blades and closing upon the spiral surface thereof, substantially as described.

In witness whereof I have hereunto set my hand.

JEREMIAH E. DAY.

Witnesses:
S. H. NOURSE,
H. C. LEE.